(12) United States Patent
Klotblixt

(10) Patent No.: US 12,722,257 B2
(45) Date of Patent: Sep. 1, 2026

(54) METHOD OF CONTROLLING A PULSED CURRENT SUPPLIED TO A MOTOR OF AN ELECTRIC POWER TOOL

(71) Applicant: ATLAS COPCO INDUSTRIAL TECHNIQUE AB, Stockholm (SE)

(72) Inventor: Adam Klotblixt, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 27 days.

(21) Appl. No.: 18/956,512

(22) Filed: Nov. 22, 2024

(65) Prior Publication Data

US 2025/0083288 A1 Mar. 13, 2025

Related U.S. Application Data

(62) Division of application No. 17/333,095, filed on May 28, 2021, now Pat. No. 12,226,880, which is a (Continued)

(30) Foreign Application Priority Data

Jun. 30, 2016 (SE) .................................... 1630172-3

(51) Int. Cl.
*B25B 21/02* (2006.01)
*B25B 21/00* (2006.01)
(Continued)

(52) U.S. Cl.
CPC .............. *B25B 21/02* (2013.01); *B25B 21/00* (2013.01); *B25B 23/1405* (2013.01); (Continued)

(58) Field of Classification Search
CPC ..... B25B 21/02; B25B 21/00; B25B 23/1405; B25B 23/1425; B25B 23/147; H02P 7/03
(Continued)

(56) References Cited

U.S. PATENT DOCUMENTS 6,680,595 B2 1/2004 Ito
7,770,658 B2 8/2010 Ito et al.
(Continued)

FOREIGN PATENT DOCUMENTS

EP 0808018 A1 11/1997
JP S5859770 A 4/1983
(Continued)

OTHER PUBLICATIONS

International Search Report (ISR), Written Opinion, and International Preliminary Report on Patentability (IPRP) dated Aug. 31, 2017 issued in International Application No. PCT/EP2017/064921.
Japanese Office Action dated Feb. 2, 2022, issued in Japanese Application No. 2018-568414.
(Continued)

*Primary Examiner* — Veronica Martin
*Assistant Examiner* — Mary C Hibbert-Copeland
(74) *Attorney, Agent, or Firm* — Holtz, Holtz & Volek PC

(57) ABSTRACT

A method for an electric power tool includes providing a main current pulse (A) in a first direction driving a rotating shaft in a first direction to add torque to a joint; after providing the main current pulse (A), providing a current pulse (C) in an opposite direction to the first direction; immediately prior to providing the current pulse (C) in the opposite direction, providing a first pre-pulse current pulse (B) that is in the same direction as the current pulse (C) in the opposite direction and of a magnitude lower than the current pulse (C) in the opposite direction; and immediately prior to providing the main current pulse (A), providing a second pre-pulse current pulse (D) that is in the same direction as the main current pulse (A) and of a magnitude lower than the main current pulse.

3 Claims, 3 Drawing Sheets

Related U.S. Application Data division of application No. 16/313,691, filed as application No. PCT/EP2017/064921 on Jun. 19, 2017, now Pat. No. 11,364,604.

(51) Int. Cl.

| | |
|---|---|
| ***B25B 23/14*** | (2006.01) |
| ***B25B 23/142*** | (2006.01) |
| ***B25B 23/147*** | (2006.01) |
| ***H02P 7/03*** | (2016.01) |

(52) U.S. Cl.

CPC ........ *B25B 23/1425* (2013.01); *B25B 23/147* (2013.01); *H02P 7/03* (2016.02)

(58) Field of Classification Search

USPC ........................................................ 173/93.5

See application file for complete search history.

(56) References Cited

U.S. PATENT DOCUMENTS

| | | | | |
|---|---|---|---|---|
| 2003/0090227 | A1* | 5/2003 | Ito ...................... | B25B 23/1405 318/434 |
| 2012/0234566 | A1* | 9/2012 | Mashiko ................ | B25B 21/02 173/93.5 |
| 2013/0062088 | A1 | 3/2013 | Mashiko et al. | |
| 2013/0087355 | A1 | 4/2013 | Oomori et al. | |
| 2014/0158390 | A1 | 6/2014 | Mashiko et al. | |

FOREIGN PATENT DOCUMENTS

| | | | |
|---|---|---|---|
| JP | 2005144625 | A | 6/2005 |
| JP | 2011251354 | A | 12/2011 |
| WO | 2011102559 | A1 | 8/2011 |

OTHER PUBLICATIONS

Japanese Office Action dated Jun. 10, 2021 issued in Japanese Application No. 2018-568414.

* cited by examiner

METHOD OF CONTROLLING A PULSED CURRENT SUPPLIED TO A MOTOR OF AN ELECTRIC POWER TOOL

CROSS REFERENCE TO RELATED APPLICATIONS

This application is a Divisional Application of U.S. application Ser. No. 17/333,095, filed May 28, 2021, which is Divisional Application of U.S. application Ser. No. 16/313,691, filed Dec. 27, 2018, and issued as U.S. Pat. No. 11,364,604 on Jun. 21, 2022, which is a National Stage Application of International Application No. PCT/EP2017/064921, filed Jun. 19, 2017, which is based upon and claims the benefit of priority from Swedish Patent Application No. 1630172-3, filed Jun. 30, 2016, the entire contents all of which are all incorporated herein by reference.

TECHNICAL FIELD

The invention relates to a pulsed electric power tool. In particular the invention relates to an electric power tool for performing tightening operations where torque is delivered in pulses to e.g. tighten and/or loosen screw joints.

BACKGROUND

Power assisted tools for fastening bolts, screws and nuts are used in a large field of applications. In some of those applications it is desired or even required to be able to control the clamping force or at least an associated torque. Such power assisted tools are typically controlled to rotate a shaft of the tool such that the torque is measured and when the torque reaches a predetermined value the electric power tool is controlled to stop the shaft rotation. This can for example be accomplished by cutting the power to the tool or a clutch can be slid.

A problem encountered when operating a power assisted tool, in particular a handheld power tool with a rotating shaft, is that the operator is subject to a reaction force. One way to reduce the reaction force transferred to the operator is to use a pulsed electric motor that is fed with a series of energy pulses driving the electric motor in a pulsed manner. The energy can typically be supplied as current pulses. Hereby the reaction force that the operator needs to cope with can be reduced.

U.S. Pat. No. 6,680,595 describes a control method and a fastening apparatus for fastening a screw. The fastening apparatus is controlled to output a pulsed increasing torque. The actual torque is determined and the motor is stopped when the actual torque reaches a target value. The pulsed increasing torque is generated by feeding a pulsed increasing current to the electric motor of the fastening apparatus.

Also, U.S. Pat. No. 7,770,658 describes a control method and a fastening apparatus for fastening a screw. The actual torque is determined and the motor is stopped when the actual torque reaches a target value. Further, when the actual torque reaches a set value the torque delivered by the fastening apparatus is reduced. The pulsed torque is generated by feeding a pulsed current to the electric motor of the fastening apparatus.

There is a constant desire to improve the operation of power assisted fastening tools. For example the reaction force transferred to the operator should be as small as possible to improve the working conditions of the operator. At the same time the fastening process should be fast and the variations in the resulting final torque should be small to guarantee that the end result of the fastening process is within set values.

Hence, there exists a need for an improved pulsed fastening method and apparatus to be used in a pulsed electric power tool.

SUMMARY

It is an object of the invention is to provide an improved pulsed electric power tool, and a method for controlling the operation thereof.

This object is obtained by the methods and devices as set out in the appended claims.

In accordance with one embodiment an electric power tool comprising an electrical motor adapted to drive a rotating shaft of the electric power tool is provided. The electric motor is adapted to be fed with a pulsed current where the pulsed current comprises a main current pulse in a first direction driving the rotating shaft of the electric power tool in a first direction and a current in the opposite direction to said first direction following said main current pulse to retract the electrical power tool. Hereby it is obtained that the tool is retracted between successive tightening pulses in order to improve the ergonomics. The current in the opposite direction can be provided as current controlled current pulse or can alternatively be provided in some other manner such as indirectly controlling the current of the current pulse. One way of providing the current indirectly is to control the motor speed in the reverse direction during (at least a part of) a time interval between successive tightening pulses provided to the pulsed electric power tool.

In accordance with one embodiment the pulsed current prior to said current in the opposite direction comprises a first pre-pulse current pulse wherein the current pulse of the first pre-pulse is in the same opposite direction and of a magnitude lower than said current in the opposite direction. Hereby backlash in the backward direction can be reduced or even eliminated by placing the tool in a position where play when rotating the shaft of the tool is reduced or eliminated. Typically, the play in a gear arrangement can be reduced or eliminated in this way.

In accordance with one embodiment the pulsed current prior to said main pulse comprises a second pre-pulse current pulse wherein the current pulse of said second pre-pulse is in the same direction as the main current pulse and of a magnitude lower than said main current pulse. Hereby backlash in the forward direction can be reduced or even eliminated by placing the tool in a position where play when rotating the shaft of the tool is reduced or eliminated. Typically, the play in a gear arrangement can be reduced or eliminated in this way.

In accordance with one embodiment the electric power tool comprises a torque sensor for sensing the actual torque provided during a tightening operation performed by the electric power tool. Hereby it is possible to provide an improved control of the tightening operation and also to improve the control of the current in the opposite direction when retracting the tool.

In accordance with one embodiment the motor of the electric power tool is connected to the rotating shaft via a gear arrangement.

The invention also extends to a control method for controlling an electric power tool. In accordance with one embodiment a method of controlling current supplied to a motor of an electric power tool is provided. The electric power tool comprises a rotating shaft driven by the motor.

The control method comprises providing a pulsed current comprising a main current pulse in a first direction driving the rotating shaft of the electric power tool in a first direction to add torque to a joint and providing a current in the opposite direction to said first direction following the main current pulse to retract the electrical power tool. The current in the opposite direction can be provided as current pulse or can alternatively be provided in some other manner such as indirectly. One way of providing the current indirectly is to control the motor speed in the reverse direction during (at least a part of) a time interval between successive tightening pulses provided to the pulsed electric power tool.

In accordance with one embodiment the magnitude of a current pulse in the opposite direction is selected to not loosen the joint. In accordance with one embodiment the magnitude of the current pulse in the opposite direction is correlated to the magnitude of said main current pulse. In accordance with one embodiment the magnitude of the current pulse in the opposite direction is linearly correlated to the magnitude of the main current pulse. In accordance with one embodiment the magnitude of the current pulse in the opposite direction is 5-50% of the magnitude of the main current pulse. In accordance with one embodiment current pulse in the opposite direction comprises a ramped leading edge. In accordance with one embodiment the ramped leading edge is linearly ramped.

In accordance with one embodiment a first pre-pulse current pulse prior to a current in the opposite direction is provided. The current pulse of the first pre-pulse is in the same direction as the current in the opposite direction and of a magnitude lower than the current pulse in the opposite direction. In accordance with one embodiment the first pre-pulse is applied until a pre-set threshold value of a measured applied torque to the joint is reached.

In accordance with one embodiment a second pre-pulse current pulse prior to said main pulse is provided. The current pulse of said second pre-pulse is in the same direction, i.e. typically in the tightening direction, as the main current pulse and of a magnitude lower than said main current pulse. In accordance with one embodiment the second pre-pulse is applied until a pre-set threshold value of a measured applied torque to the joint is reached.

In accordance with one embodiment a method of controlling current supplied to a motor of an electric power tool is provided. The electric power tool comprises a rotating shaft driven by the motor. The control method comprises providing a pulsed current comprising a main current pulse in a first direction driving the rotating shaft of the electric power tool in a first direction to add torque to a joint and providing a current in the opposite direction to said first direction following the main current pulse to reduce backlash in the electrical power tool. In accordance with one embodiment the magnitude of the current pulse in the opposite direction to the first direction is 10-20% or less than the magnitude of the main current pulse. In accordance with one embodiment the current pulse in the opposite direction is provided until a measured torque in the joint is below a threshold value.

In accordance with one embodiment a method of controlling current supplied to a motor of an electric power tool is provided. The electric power tool comprises a rotating shaft driven by the motor. The control method comprises providing a pulsed current comprising a main current pulse in a first direction driving the rotating shaft of the electric power tool in a first direction to add torque to a joint and providing a current pulse prior to the main pulse wherein the current pulse is in the same direction as the main current pulse and of a magnitude lower than said main current pulse to remove forward backlash. In accordance with one embodiment the magnitude of the current pulse is 10-20% or less than the magnitude of the main current pulse. In accordance with one embodiment the current pulse is provided until a measured torque in the joint is above a threshold value.

The invention also extends to a power tool adapted to perform any of the methods as set out above and to a control unit adapted to perform any of the methods as set out above. The control unit can be external or internal to a power tool controlled by the control unit.

BRIEF DESCRIPTION OF THE DRAWINGS

The invention will now be described in more detail and with reference to the accompanying drawings, in which.

DETAILED DESCRIPTION

Conventional power tools such as nutrunners or screw drivers of today are typically provided with sensors, such as angle encoders and/or torque meters, which make it possible to control the quality of a performed work operation, such as the tightening of a joint.

Further, for hand held power tools in particular, it is important both that the reaction force that the operator is subject to is as low as possible and that the time of concluding a specific tightening operation is as short as possible. An operator may conduct many hundreds of tightening operations during a working cycle and it is therefore important that they are both ergonomic for the well-being of the operator and rapid for the productivity at the work station. An ergonomic tightening operation typically implies that the reaction torque is as low as possible. Further, it can be advantageous to remove backlash in an electric power tool. Backlash is an effect that occurs due to the mechanical play in the tool and when the driving starts when there is a play. Thus, the motor will drive the shaft via a number of interconnected mechanical components. Each mechanical connection in the drive will add to the total play. For example, a gear arrangement will add to the total play in many small steps. When starting to drive the motor in a particular direction there will be a backlash due to the fact that typically not all mechanical components are in direct connection to each other in the drive direction. The magnitude of the backlash is therefore a result of the total play between the motor and the rotating shaft acting on a fastening device. In other words it is typically advantageous to start a driving action when there is no play in the tool and all mechanical parts driving the shaft are in direct contact without any play.

Figure 1:
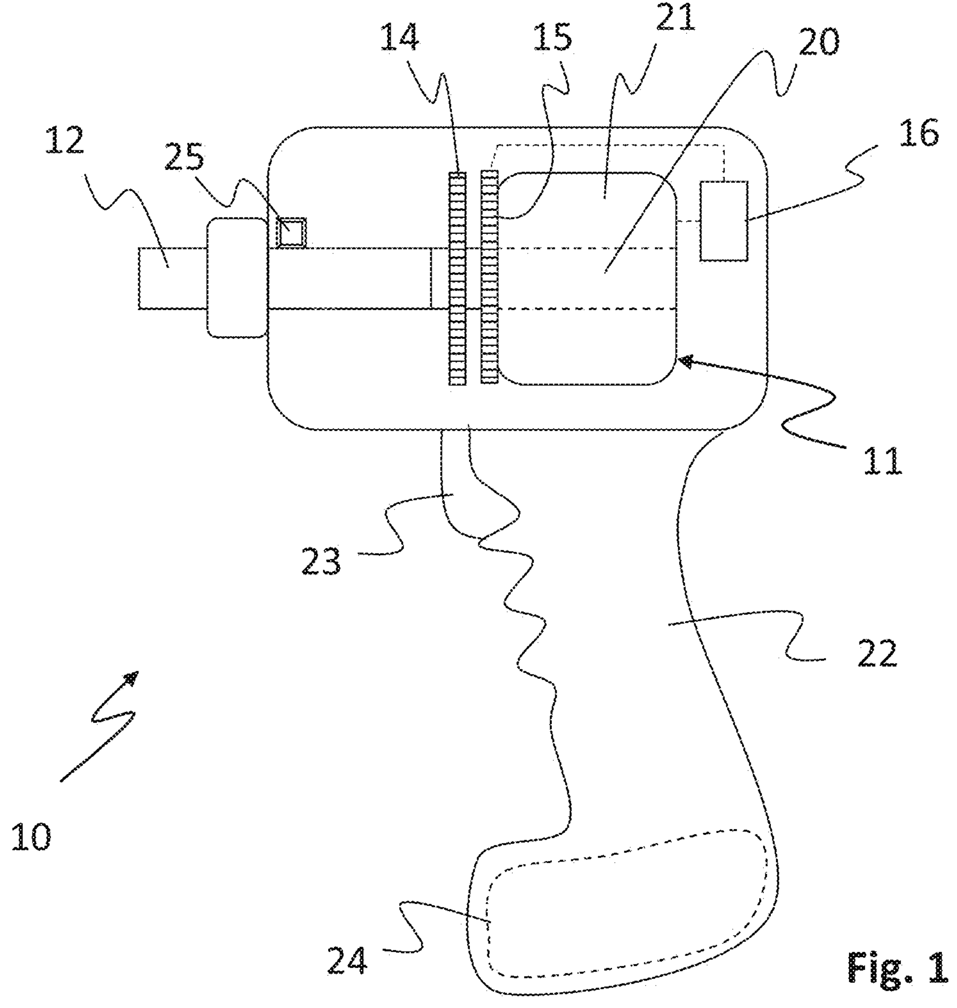
FIG. 1 shows a longitudinal section through a power tool.

FIG. 1 depicts an exemplary electric power tool 10 in accordance with an embodiment of the invention. The tool 10 is configured to perform tightening operations where torque is delivered in a series of pulses to tighten screw joints or a similar action involving a rotational action performed by the tool 10. For this purpose the pulse tool comprises an electric motor 11 having a rotor 20 and a stator 21. The electric motor 11 is arranged to be rotated in two opposite rotational directions, clockwise and counter clockwise.

The tool 10 further comprises a handle 22, which is of a pistol type in the shown embodiment. The invention is however not limited to such a configuration but can be applied in any type of power tool and not limited to the design of FIG. 1. A power supply 24 is connected to the motor 11. In the embodiment shown the power supply is a battery that can be arranged in the lower part of the handle. Other types of power supplies are also envisaged such as an external power supply supplying power via an electrical cable to the tool 10. The tool 10 can further comprise a trigger 23 arranged for manipulation by the operator to control the powering of the electrical motor 11. In some embodiments the tool 10 is connected to an external control unit (not shown). The external control unit can supply the tool 10 with electrical power. The control unit can also be arranged to transmit and receive signals to/from the tool 10 to control the tool.

Further, the tool comprises an output shaft 12 and may optionally also comprise different sensor(s) 14, 15, 25 for monitoring one or more parameters relating to the operation performed by the tool 10. Such parameters can typically be a delivered torque pulse, etc. The sensor(s) may for example be a torque sensor, an angle sensor, an accelerometer, a gyro, or the like.

The invention can advantageously be applied in a power tool where the output shaft 12 is connected to the motor 11 via a gear arrangement (not shown). The invention is however not limited to such a type of power tool.

A torque sensor 25 can be arranged to measure the torque directly. As an alternative a measured retardation may be used to calculate the torque that is installed into the joint. The torque sensor 25 is in accordance with one embodiment arranged on the output shaft 12 as close as possible to the joint in order to monitor the delivered torque. Alternatively the torque sensor 25 can be located on the gear arrangement.

A control unit 16 is arranged to control the electric motor 11. In the embodiment shown the control unit 16 is provided integrated in the tool 10. However, the control unit can also be located in an external unit and connected by wire or wirelessly to the tool 10. The sensor(s) 14, 15, 25 can typically be arranged to provide information regarding the monitored parameter(s) to the control unit 16. This is conventional in controlled tightening operations where the tightening is governed towards a specific target value, such as target torque, angle or clamp force.

Figure 2:
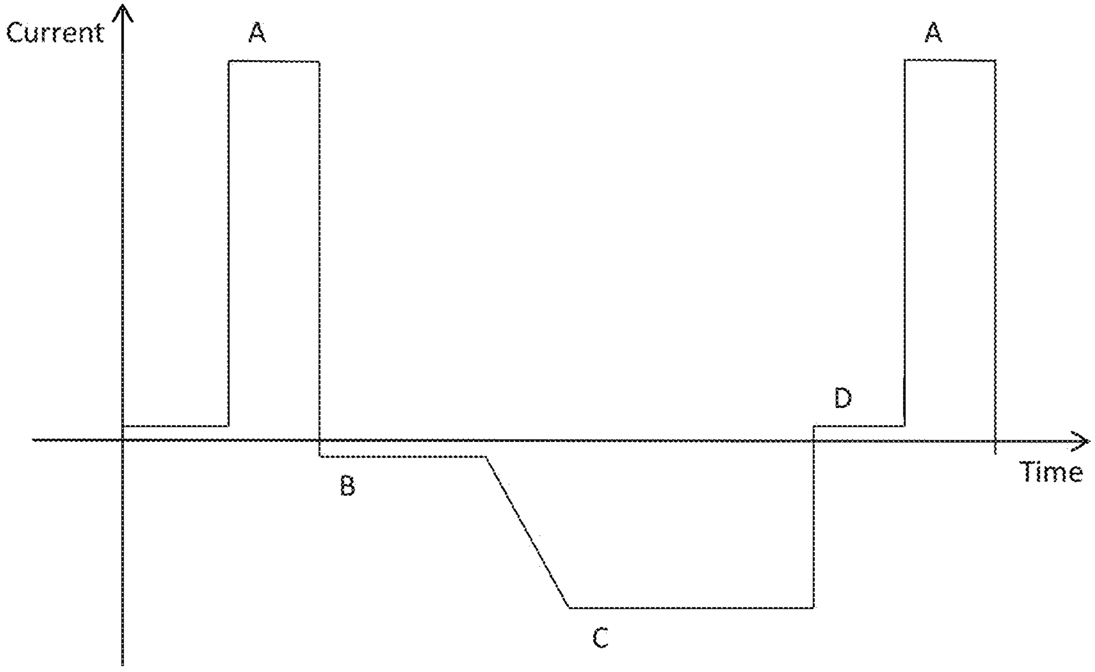
FIG. 2 depicts a diagram of a current pulse sequence used in operation of a power tool.

The control unit 16 can be adapted to control the current fed to the electric motor 11. FIG. 2 depicts a diagram of a current pulse sequence being a part of a pulse train used in operation of a power tool such as the power tool 10 of FIG. 1 or any other electrically powered power tool comprising an electric motor. The electric motor of the power tool is fed with a pulsed current for driving the power tool in a first direction. For ease of explanation it is here assumed that the first direction is a tightening direction wherein a joint is tightened and that the tool typically is used to be operated in said first direction. For example the power tool can be a nut runner or a power wrench used for tightening a fastening device such as a nut or a bolt. The first direction is then the direction in which the nut or bolt is driven when fastening the fastening device.

In FIG. 2, a current pulse A is first delivered to the electric motor 11 of the electric power tool 10. The current pulse A has a direction that drives the electrical motor in the first direction. The magnitude of the pulse A is set to a value such that the fastening device that the electric power tool is fastened or tightened. Such a pulse A can be termed a tightening pulse. In some applications the duration of the tightening pulse can be about 1-20 ms. The current supplied can in some embodiments be the maximum current for which the electric motor of the power tooled is dimensioned or a current close to such a current, for example at least 50% of the maximum current for which the electric motor is dimensioned. The tightening pulse A can be generally square shaped. The rise and fall time of the tightening pulse A can typically be short. For example the rise and/or fall time of the pulse A can be about 10% or less than the duration of the pulse A. When a tightening pulse A is supplied to the electric motor, the electric motor will be driven in the first direction thereby acting to tightening a fastening device that the electrical power tool is provided to fasten. Hence, a tightening pulse A will typically act to add torque to the fastening device.

When the tightening pulse A has ended the current supplied to the electrical motor can be set to a value not driving the electrical motor in a first direction. In accordance with one embodiment the electrical current is set to a value corresponding to the value equal or substantially equal to the value immediately before the tightening pulse A was applied. In accordance with one embodiment the electrical current delivered to the electrical motor is set to zero at the end of pulse A.

In yet another embodiment the tightening pulse A is followed by a pulse B during which a relatively small electrical current pulse is delivered to the electrical motor in a second direction, opposite to the first direction. In particular such a pulse B can be applied immediately following the end of the tightening pulse A. The magnitude of the electrical current of pulse B is typically small, in particular smaller than the magnitude of the electrical current supplied during pulse A. In accordance with some embodiments the magnitude of the pulse B is 10-20% (or less) than the magnitude of the tightening pulse A. By providing such a pulse B it is possible to mitigate the backlash in the electric power tool. As a result it is possible to remove or at least reduce backlash in the operation of the electrical power tool. The backlash removal Pulse B can be termed a first pre-pulse pulse B. The pre-pulse B can typically be applied until the torque applied is close to zero. For example the pre-pulse B can be applied until the torque sensors give an output of 0 Nm or a value below some pre-set threshold value.

In order to retract the electric power tool, a pulse C in the reverse direction of pulse A can be supplied to the electric motor. The pulse C can be termed a retracting pulse C. The retracting pulse C can follow after, in particular immediately after, a tightening pulse A or, if a first pre-pulse B is used, the retracting pulse C can follow after such a first pre-pulse pulse B. The magnitude of the retracting pulse C is selected to not loosen the fastening device of the joint that the electrical power tool is used to tighten. The magnitude of the pulse C is therefore selected to be lower than the tightening pulse A. In accordance with some embodiments the retracting pulse C can be shaped to have a ramped first section during which the current in the reverse direction is successively increased to a maximum magnitude. Hence, the ramped first section will form a leading edge of the retracting pulse C. In accordance with one embodiment the current is ramped linearly. In other embodiments other shapes of the ramped current can be used. The retracting pulse C can in accordance with some embodiments have a duration of about 10-20 ms. Further, the absolute value of the current can be about 5-50% of the absolute value of the current for the tightening pulse A. In accordance with some embodiments the magnitude of the maximum current in the reverse direction during the retracting pulse C is correlated to the torque delivered during the tightening pulse A preceding the retracting pulse C. In accordance with some embodiment a higher torque during tightening pulse A can result in a higher magnitude of the current supplied during the retracting pulse C. In accordance with some embodiments the maximum current used in the reverse direction during the retracting pulse C is set proportional to the torque achieved during the tightening pulse A immediately preceding the retracting pulse C.

In accordance with an alternative embodiment the current in the reverse direction is indirectly controlled by controlling the motor speed in the reverse direction following a tightening pulse the motor of the power tool. In such an embodiment the speed can be controlled by determining the maximum speed in the reverse direction of the motor in the reverse direction following a positive current pulse. The motor is then speed controlled during a time interval. The time interval can for example be from when a maximum reverse speed of the motor is determined until a next current pulse in the tightening direction is to be provided. The speed in the reverse direction can for example be controlled to be based on the determined maximum reverse speed. For example the reverse maximum speed can be maintained or the reverse speed can be controlled to a percentage of the maximum speed during the time interval. The control of the motor speed in the reverse direction can be used as an indirect way of providing a current in the opposite direction during a time interval to retract the tool. This is made possible due to the fact that the motor speed in the reverse direction following a tightening pulse is typically proportional to the torque following the tightening pulse.

By applying a retracting force it is possible to improve the ergonomics when using the electric power tool. This is particularly useful for a handheld electric power tool.

The retracting pulse C can be followed by a forward backlash removal pulse here termed second pre-pulse D during which a relatively small electrical current is delivered to the electric motor in the forward direction. In particular such a pulse D can be applied immediately following the end of the retracting pulse C. The magnitude of the electrical current of pre-pulse D is typically small, in particular smaller than the magnitude of the electrical current supplied during pulse C. In accordance with some embodiments the magnitude of the pulse D is 10-20% (or less) than the magnitude of the retracting pulse C. By providing such a pulse D it is possible to provide a pre-tension in the forward direction. As a result it is possible to remove or at least reduce backlash in the operation of the electrical power tool after the retracting pulse C has been applied. The pre-pulse D can in accordance with one embodiment be applied until a torque sensor output a positive value, or a value above some pre-set threshold value.

In the above it is not necessary to make use of all of the different pulses in the pulse sequence described. For example the tightening pulse A can be supplemented by any suitable combination of pulses B, C and/or D in order to obtain an efficient yet ergonomic pulsing of the electric power tool. In accordance with one specific example pre-pulse D is omitted. This can have the advantage that the tightening procedure become more efficient. However, the wear on the electric power tool may increase instead.

Figure 3:
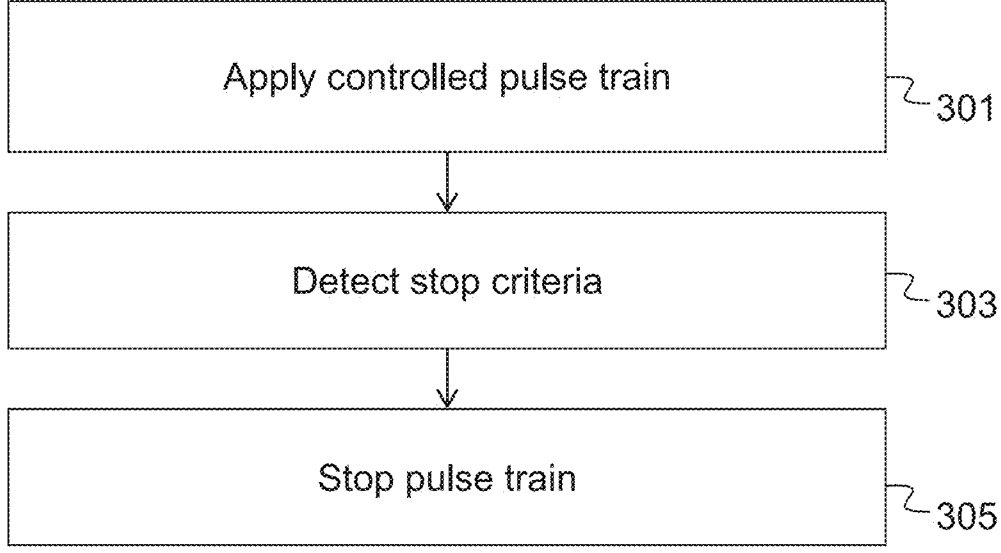
FIG. 3 is a flow chart illustrating some steps when controlling a power tool.

In FIG. 3 a flowchart illustrating some steps when controlling current to a power tool during operation thereof in accordance with the above is shown. First, in a step 301, a pulse train in accordance with the above is provided. This can be performed by supplying a current pulse train having a main current pulse A and followed by a negative current pulse C as described above in conjunction with FIG. 2. Other pulse trains as described in accordance with FIG. 2 may also be used. Next, in a step 303, it is determined if a stop criteria is fulfilled such as if a detected torque reaches a predetermined value. Then, in a step 305, the current pulse train is stopped when the stop criteria is fulfilled.

In the above the pulsed energy supplied to the motor is described as a controlled pulsed current. It is however envisaged that the pulsed energy is controlled based on some other parameter other than current. The term (current) pulse as used herein therefore also includes other types of energy pulses other than current controlled pulses, such as motor speed control pulses, voltage controlled pulses or the like.

The invention claimed is:

1. A method of controlling a pulsed current supplied to a motor of an electric power tool that includes a rotating shaft driven by the motor, the method comprising:

providing a main current pulse (A) in a first direction driving the rotating shaft in a first direction to add torque to a joint; and immediately prior to providing the main current pulse (A), providing a current pulse (D) that is in the same direction as the main current pulse (A) and of a magnitude lower than the main current pulse (A), to remove forward backlash, wherein only one current pulse (D) is supplied immediately prior to providing the main current pulse (A), and wherein a current pulse supplied immediately prior to the current pulse (D) is in an opposite direction from the current pulse (D) and the main current pulse (A).

2. The method according to claim 1, wherein a magnitude of the current pulse (D) is 10-20% or less of a magnitude of the main current pulse (A).

3. The method according to claim 1, wherein the current pulse (D) is provided until a measured torque in the joint is above a threshold value.

* * * * *